(12) United States Patent
Jin et al.

(10) Patent No.: US 7,986,787 B2
(45) Date of Patent: Jul. 26, 2011

(54) SYSTEM, METHOD, AND SERVICE FOR TRACING TRAITORS FROM CONTENT PROTECTION CIRCUMVENTION DEVICES

(75) Inventors: Hongxia Jin, San Jose, CA (US); Jeffrey Bruce Lotspiech, Henderson, NV (US); Philip Anastasios Zigoris, Santa Cruz, CA (US)

(73) Assignee: International Business Machines Corporation, Armonk, NY (US)

( * ) Notice: Subject to any disclaimer, the term of this patent is extended or adjusted under 35 U.S.C. 154(b) by 1108 days.

(21) Appl. No.: 11/608,268

(22) Filed: Dec. 8, 2006

(65) Prior Publication Data

US 2008/0137864 A1 Jun. 12, 2008

(51) Int. Cl.
*H04L 9/00* (2006.01)

(52) U.S. Cl. ............ 380/277; 380/30; 380/200; 703/13; 705/52; 726/26

(58) Field of Classification Search .................... 726/26; 703/13; 380/277, 200
See application file for complete search history.

(56) References Cited

U.S. PATENT DOCUMENTS

| | | | | |
|---|---|---|---|---|
| 6,304,833 | B1 * | 10/2001 | Ferkinhoff et al. | 703/2 |
| 7,007,162 | B1 * | 2/2006 | Lotspiech | 713/151 |
| 7,039,803 | B2 | 5/2006 | Lotspiech et al. | |
| 2001/0034712 | A1 * | 10/2001 | Colvin | 705/52 |
| 2002/0133701 | A1 * | 9/2002 | Lotspiech et al. | 713/163 |
| 2003/0070003 | A1 * | 4/2003 | Chong et al. | 709/330 |
| 2006/0153377 | A1 * | 7/2006 | Arditti Modiano | 380/200 |
| 2006/0195415 | A1 * | 8/2006 | Meyer | 707/1 |
| 2007/0033419 | A1 * | 2/2007 | Kocher et al. | 713/193 |
| 2008/0075287 | A1 * | 3/2008 | Boneh et al. | 380/277 |

OTHER PUBLICATIONS

Moni Naor and Benny Pinkas "Threshold Traitor Tracing" Published by H. Krawczyk : CRYPT0'98 LNCS 1462, pp. 502-517, 1998.*
Naor, D., et al., "Revocation and Tracing Schemes for Stateless Receivers," Crypto 2001, LNCS vol. 2139, pp. 41-62, 2001.
Vomlel, Jiri, "Bayesian networks in Mastermind," Proceeding of the 7th Czech-Japan Seminar, Awaji Island, Japan, 2004.
Rish, Irina, "Adaptive Diagnosis in Distributed Systems," IEEE Transactions on Neural Networks, vol. 16, No. 5, Sep. 2005, pp. 1088-1109.
Judea Pearl, "Casuality: models, reasoning, and inference", Cambridge University Press, 2000; ISBN 0-521-77362-8.
Office Action dated Nov. 9, 2010 from related U.S. Appl. No. 12/134,113.

* cited by examiner

*Primary Examiner* — Taghi T Arani
*Assistant Examiner* — Jason Lee
(74) *Attorney, Agent, or Firm* — Shimokaji & Associates PC

(57) ABSTRACT

A traitor tracing system generates a hypothesized model of the circumvention device that models a hypothesized set of device keys compromised by the circumvention device. The system iteratively invokes a subset tracing system to identify a compromised device key until substantially all the compromised device keys in the set of compromised device keys are identified so as to disable the circumvention device. A subset tracing system generates a circumvention device model that models behavior of a circumvention device using prior knowledge and The system iteratively selects and applies to the circumvention device a test based on the hypothesized model and the circumvention device model and receives a response from the circumvention device indicating a success of the test in playing protected content on the circumvention device. The system updates the hypothesized model using the received response, the selected test, a current version of the hypothesized model, and a current version of the circumvention device model to focus the test selecting process in determining the device keys obtained from the traitor.

3 Claims, 9 Drawing Sheets

SYSTEM, METHOD, AND SERVICE FOR TRACING TRAITORS FROM CONTENT PROTECTION CIRCUMVENTION DEVICES

FIELD OF THE INVENTION

This invention relates to preventing piracy of digital content in a broadcast encryption system and more specifically to detecting pirated keys in a circumvention device generated by an adversary to pirate protected digital content.

BACKGROUND OF THE INVENTION

The entertainment industry is in the midst of a digital revolution. Music, television, and movies are increasingly becoming digital, offering new advantages to the consumer in quality and flexibility. At the same time, since digital data can be perfectly and quickly copied, the digital revolution also comprises a threat. If consumers may freely copy entertainment content and offer that content on the Internet, the market for entertainment content would evaporate.

To solve this problem, several content protection schemes have been devised and are in wide use in the market. For example, DVD video is protected by the Content Scrambling System (CSS), DVD audio is protected by Content Protection for Pre-recorded Media (CPPM), digital video and audio recorders are protected by Content Protection for Recordable Media (CPRM), and digital busses are protected by Digital Transmission Content Protection (DTCP). All these schemes are based on encryption of the content. The device manufacturer is given cryptographic keys to decrypt the content, and in return is obligated by the license to follow a set of rules limiting the physical copies that can be made from a single piece of content.

The cryptographic keys required to encrypt and decrypt the content are distributed from a key generation facility to various entities involved in the content distribution network: content creators, media duplication facilities, devices for playing content, content distribution facilities, etc. Maintaining the secrecy of the cryptographic keys is essential for maintaining the integrity of a secure content protection scheme. The consequences of accidental or malicious disclosure of the long-lived secret keys are grave; loss of these secrets can lead total breakdown of the copy protection schemes the secrets support, and ultimately, to huge monetary loss for the participants of the copy protection scheme.

In the event that a device (and its keys) becomes compromised, deliberately or by mistake, it is necessary to revoke the keys of that device. Revoking a set of keys effectively renders the compromised device (and any clones thereof) inoperable to play content that is produced after the revocation.

Content protection solutions such as CPRM have utilized broadcast encryption technologies. In these solutions, each device is assigned a set of device keys that can be indirectly used to decrypt the content. The device keys, owned by compliant devices, repeatedly encrypt the content encrypting key (called the media key) in a structure called a media key block (MKB). Each device uses its device key to decrypt the media key block to obtain a valid media key to decrypt the content.

To circumvent the content protection solutions, an adversary may break a device, extract the device keys, and build a circumvention device (also known as a clone device or a clone box) comprising the extracted device keys to decrypt protected content. To identify which original devices (called traitors) have donated their keys to the circumvention device, traitor-tracing technologies are used.

One conventional traitor-tracing technology uses forensic media key blocks. When a circumvention device is found, the license agency starts feeding forensic media key blocks to the device. These forensic media key blocks are different from normal media key blocks in that the forensic media key blocks only work correctly for a fraction of the devices in the system. By sending a sequence of forensic media key blocks to the circumvention device, the licensing agency can determine precisely which device keys the circumvention device comprises. The licensing agency can then produce new media key blocks that revoke those compromised device keys such that newly released content cannot be played by the circumvention device.

Another conventional traitor-tracing technology comprises a subset-difference method, that is described, for example, in "Naor D., et al., "Revocation and Tracing Schemes for Stateless Receivers", Crypto 2001, LNCS Volume 2139, pages 41-62, 2001, which is incorporated in its entirety herein by reference. The subset-difference method comprises a "subset tracing" method as the basic building block for a traitor-tracing scheme. The subset tracing method has proven to be theoretically useful. A circumvention device may comprise many device keys, each obtained by reverse engineering a legitimate device. To determine the compromised keys, the subset tracing method requires on the order of $T^3 \log(T)$ forensic media key blocks to test a circumvention device comprising T sets of compromised device keys. However, this method has not proven to be a completely practical solution, in that the measures taken by the circumvention device might slow down the testing process. For example, each testing iteration may take a minute or more. A circumvention device comprising 100 compromised keys (i.e., T=100) may require over 15 years to determine the device keys the circumvention device has compromised. In effect, such a circumvention device had defeated the content protection system.

What is therefore needed is a system, a service, a computer program product, and an associated method for tracing traitors from a content protection circumvention devices that reduces the number of forensic media key blocks (MKBs) required to detect traitors from the circumvention device. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for A traitor tracing system maintains a set of keys, or a media key block (MKB) that is usable for legitimate devices. For the set of the keys, it also maintains a hypothesized model about the probabilities those keys are in the circumvention device. The system confirms that the circumvention device will play this MKB. If the circumvention device is unable to play the MKB, then the circumvention device would be considered to have been effectively defeated and the system returns the MKB. If, on the other hand, the circumvention device is able to play the MKB, then the circumvention device must contain at least one key in the MKB. The system then passes the hypothesized model on to the subset tracing system of the present invention to identify at least one of the keys in the MKB contained in the circumvention device. The identified key is removed from the MKB and possibly replaced with one or more keys in the MKB, such that the MKB remains usable by the legitimate devices. The hypothesized model also gets updated with the keys added into the MKB. This process is reiterated until the circumvention device is no longer able to play the MKB.

The subset tracing system of the present system begins by instantiating, based on an input, such as prior or expert knowledge, an explicit model of the behavior of the circumvention device in response to tests (circumvention device model). It gets the hypothesized model from the traitor tracing system. The system then iteratively selects tests, or forensic MKBs, based on some measure of informativeness. A selected test is then issued to the circumvention device and the response of the circumvention device is recorded. The system updates the hypothesized model based on the test, the response of the circumvention device, and the circumvention device model. After the hypothesized model is updated, the system tests whether it can confidently identify a key in the circumvention device. If so, the key is returned, otherwise the process is repeated starting from the test selection step.

The circumvention device may comprise additional compromised device keys.

The present system applies the test and receives the response iteratively, forming an iterative test. The iterative test is applied to the circumvention device until the compromised device key is determined. The test comprises a forensic media key block when fed into the circumvention device, information is obtained from the response from the circumvention device about the compromised device key.

The circumvention device model specifies the probability that a circumvention device will play a test given that the circumvention device owns a specific set of device keys. This probability is specified, either implicitly or explicitly, for all possible tests and subsets of device keys. The circumvention device model may be represented by any of the following: tabular form, function, a graphical model.

In one embodiment, the circumvention device model is fixed throughout the iterative test. In another embodiment, the circumvention device model is modified as a result of at least one of the response, the prior knowledge, and direction from a client.

The hypothesized model on a set of keys comprises a set of beliefs (or probabilities) about those keys contained in the circumvention device. That is, the hypothesized model represents a function that determines the strength of the belief that the circumvention device contains any subset of those keys. This function may be represented by any of a tabular form, a functional subroutine, or a graphical model.

Updating the hypothesized model comprises appropriately changing the representation of the hypothesized model by incorporating the response from the test. This can include overwriting a table or adding evidence to a Bayesian network. Overwriting a table, for instance, might also require the use of an appropriate inference algorithm, such as variable elimination, junction tree, or belief propagation. It might also require approximation methods such as sample based approximation, loopy belief propagation, or partition based methods.

The task of the test selection module is to determine the next best test to submit to the circumvention device. The test selection module incorporates some measure of the informativeness of a test; for example, a measure of the information gained from the test. The test selection module also includes a method for efficiently searching the set of all possible tests to identify the most informative test. This method may be exhaustive or, alternatively, it could be only an approximate search, such as a greedy-style algorithm.

The present system may be embodied in a utility program such as a traitor tracing utility program. The present system provides a method for the user to identify a circumvention device for probing by the traitor tracing utility to identify compromised device keys. The present system further provides a method for the user to input a source of prior knowledge that may be used by the traitor tracing utility program to generate a circumvention device model. The user may further provide a device key or a set of device keys; the traitor tracing utility determines whether the circumvention device comprises the provided device key(s). The user invokes the traitor tracing utility to identify compromised device keys in the circumvention device.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Circumvention Device (Clone Box): An illegitimate or non-compliant device that utilizes a pirated or otherwise compromised device key to play protected content. The circumvention device may be a hardware device, software, a web site, a web service, a peer-to-peer service, or any other entity that utilizes comprised device keys to perform unauthorized playing of protected content.

Prior Knowledge: Prior knowledge can be expert knowledge. It can be used to initialize the circumvention device model. It might also be included as an alternative initialization for the hypothesized model module.

Forensic Media Key Block (MKB): A media key block that serves as a test designed for testing a circumvention device. The forensic media key block operates correctly on only a subset of devices that utilize device keys to play protected content.

Frontier: A frontier is the set of keys that are currently under consideration by the subset tracing algorithm. The purpose of the subset tracing algorithm is to determine at least one key from the frontier that the circumvention device contains.

Traitor: A legitimate or compliant device that provides a device key to a circumvention device.

Hypothesis (Belief): A probability that the circumvention device contains a particular device key.

Figure 1:
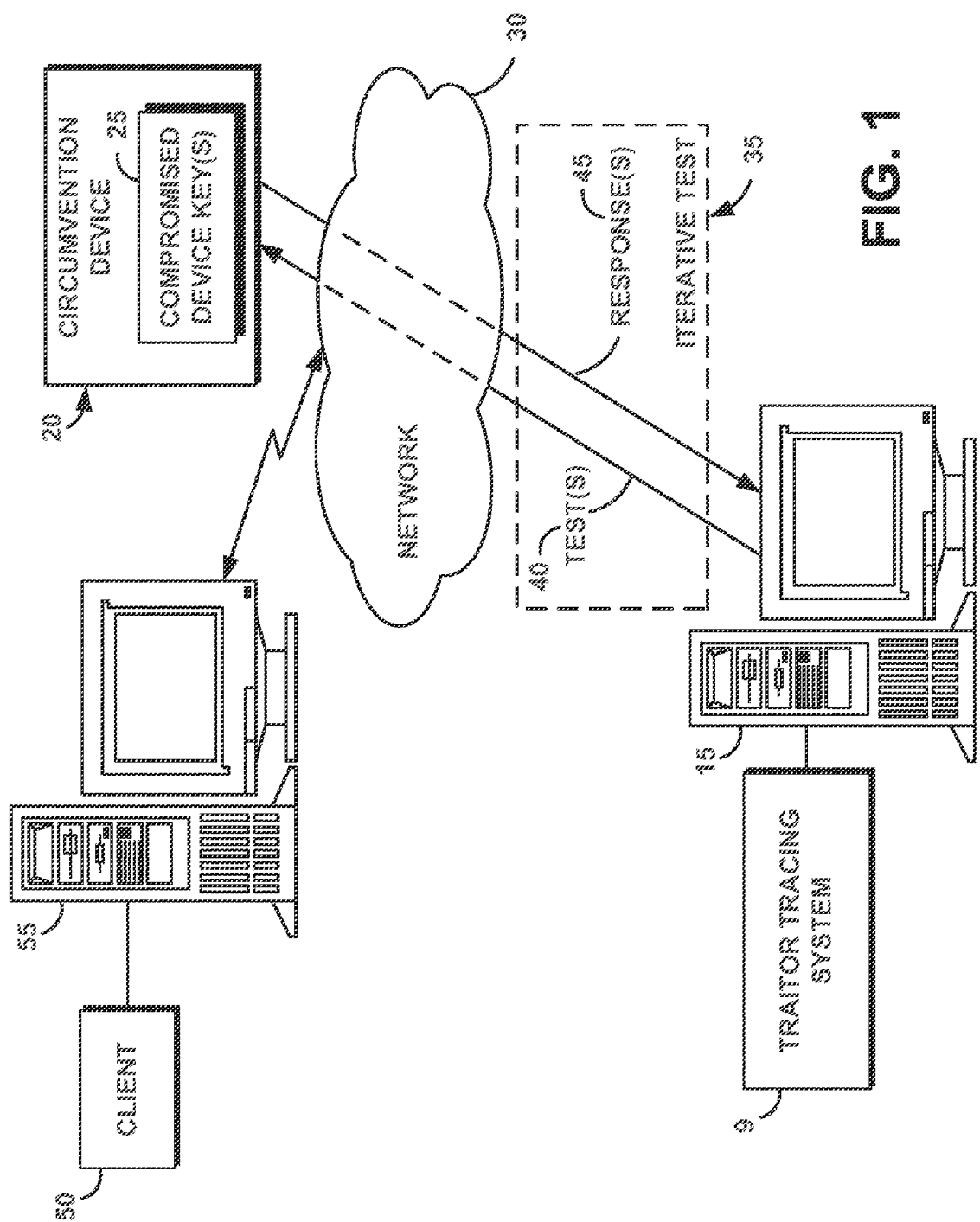
FIG. 1 is a schematic illustration of an exemplary operating environment in which a traitor tracing system of the present invention can be used.

FIG. 1 portrays an exemplary overall environment in which a traitor tracing system 9, includes a subset tracing system 10 (FIG. 2), a service, a computer program product, and an associated method (collectively referred to herein as the subset tracing system or the "system 10") for tracing traitors from content protection circumvention devices according to the present invention may be used. System 9 comprises a software programming code or a computer program product that is typically embedded within, or installed on a computational device such as, for example, a host server 15. Alternatively, system 9 can be saved on a suitable storage medium such as a diskette, a CD, a hard drive, or like devices.

System 9 can take the form of an entirely hardware embodiment, an entirely software embodiment or an embodiment containing both hardware and software elements. In a one embodiment, system 9 is implemented in software, which includes but is not limited to firmware, resident software, microcode, etc.

Furthermore, system 9 can take the form of a computer program product accessible from a computer-usable or computer-readable medium providing program code for use by or in connection with a computer or any instruction execution system. The computer program product comprises the instructions that implement a method of system 9. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks comprise compact disk—read only memory (CD-ROM), compact disk—read/write (CD-R/W), and DVD.

A data processing system suitable for storing and/or executing program code comprises at least one processor coupled directly or indirectly to memory elements through a system bus. The memory elements comprise local memory employed during actual execution of the program code, bulk storage, and cache memories that provide temporary storage of at least some program code to reduce the number of times code is retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

System 9 accesses a circumvention device 20 either remotely or locally. The circumvention device 20 is a device generated by an adversary to pirate protected digital content using pirated or compromised device keys. The adversary illegally obtains device keys from legitimate devices authorized to play protected digital content. Legitimate devices that provide device keys to the circumvention device 20 are referenced as traitors. The circumvention device 20 may comprise one or more compromised device keys 25B. System 10 determines the compromised device keys 25B used by the circumvention device 20 and provides the compromised device keys 25B to a licensing agency. The licensing agency then revokes the compromised device keys 25B. Revoking the compromised device keys 25B ensures that new media key blocks issued by a licensing agency do not allow the compromised device keys 25B to decrypt encrypted content, thus preventing the circumvention device 20 from playing protected content protected by the new media key blocks.

The circumvention device 20 may be a physical device such as a clone box. Furthermore, the circumvention device 20 may be software, a web service, a web site, etc. For exemplary purposes only, system 10 is shown in FIG. 1 accessing the circumvention device 20 via a network 30. Examples of network 30 comprise networks such as a local area network, a wide area network, a peer-to-peer network, the Internet, etc. System 9 may access the circumvention device 20 either manually or automatically. System 9 may access the circumvention device 20 either locally or via network 30.

System 10 iteratively applies an iterative test 35 to the circumvention device 20. The iterative test 35 comprises one or more tests 40 applied to the circumvention device 20. Each of the tests 40 applied to the circumvention device 20 elicits a response 45 from the circumvention device 20. System 10 iteratively uses the response 45 to focus a next text in the tests 40 on device keys that are more likely to have been compromised by the circumvention device and disregard device keys that have not been compromised by the circumvention device 20. The iterative test 35 comprises the tests 40 and the resulting responses 45.

Tests 40 comprise a forensic media such as, for example, a forensic media key block. Tests 40 are encrypted in such a way that by observing the response 45, system 10 obtains information about which compromised device keys 25B are in the circumvention device 20.

A client 50 on a computational device such as a server 55 may operate system 9 remotely to determine the compromised device keys 25B. Client 50 may further subscribe to a traitor tracing service represented by system 9, in which system 9 determines the compromised device keys 25B on behalf of client 50. The client 50 may provide a device key or a subset of device keys for which system 10 can generate and administer the iterative test 35 to determine whether the circumvention device 20 comprises the provided device key or provided subset of device keys.

Figure 2:
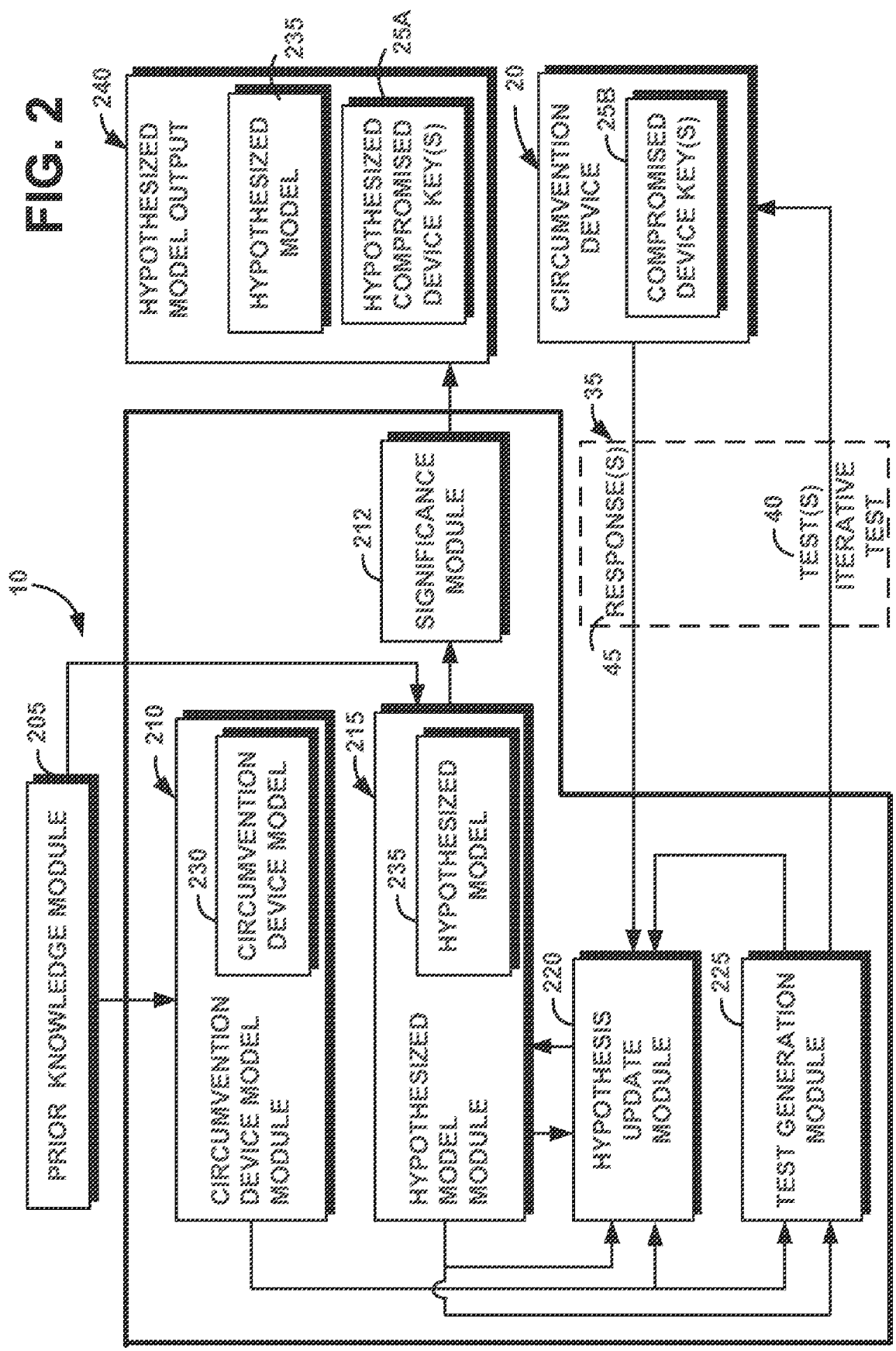
FIG. 2 is a block diagram of the high-level architecture of the traitor tracing system of FIG. 1.

FIG. 2 illustrates a high-level hierarchy of system 10. System 10 may receive input from a prior knowledge module 205, and comprises a circumvention device model module 210, a significance module 212, a hypothesized (belief) model module 215, a hypothesis update module 220, and a test selection module 225. The circumvention device model module 210 comprises a circumvention device model 230 that models behavior of the circumvention device 20. The hypothesized model module 215 comprises a hypothesized (belief) model 235 of the circumvention device 20. The significance module 212 tests the hypothesized model 235 to determine if the subset tracing system 10 has sufficient information (i.e., from the tests) to conclude that the circumvention device 20 contains a set of keys. The output of system 10 includes the hypothesized model 235, a set of one or more hypothesized compromised device keys 25A in a hypothesized model output 240. The hypothesized compromised device keys 25A are determined by applying iterative test 35 to the circumvention device 20, with a high degree of confidence.

The prior knowledge module 205 could optionally provide expert knowledge, if available or desirable, to the circumvention device model module 210 to form the circumvention device model 230. The circumvention device model 230 comprises a set of device keys and a modeled probability that one of the tests 40 plays on the circumvention device 20 given the circumvention device 20 comprises this set of device keys.

In one embodiment, the prior knowledge resides on server 15. In another embodiment, the prior knowledge resides with client 50 on server 55. In yet another embodiment, the prior knowledge resides on a web site or a web server accessible via a network such as network 30.

In one embodiment, the circumvention device model 230 is fixed throughout the iterative test 35 applied to the circumvention device 20. In another embodiment, the circumvention device model module 210 modifies the circumvention device model 230 as a result of responses 45 returned by the circumvention device 20. In a further embodiment, the circumvention device model 230 is modified in response to direction from the client 50. In yet another embodiment, the circumvention device model 230 is modified in response to direction from the prior knowledge module 205.

The hypothesized model 235 comprises a set of device keys associated with a hypothesized probability that the device keys are in the circumvention device 20. After each of the responses 45, the hypothesis update module 220 analyzes the response 45 and updates the hypothesized model 235 accordingly. The hypothesized model 235 considers results of any number of previous probes as well as reveals dependencies between the hypotheses associated with different keys. For example, if key 1 is in the circumvention device 20 then key 2 is less likely to be in the circumvention device 20.

Given these hypotheses, the test selection module 225 makes an informed decision regarding which test forensic media key block to next submit to the circumvention device 20. The test selection module 225 may use any selection criteria such as, for example, information gain, mutual information, etc. Compared to conventional approaches, system 10 substantially reduces the total number of tests necessary to reveal the compromised device keys 25B. Furthermore, flexibility of the hypothesized model 235 allows incorporation of predetermined hypotheses regarding which keys may be compromised, resulting in a further reduction in the required number of probes. The client 50 or the prior knowledge module 205 may provide these predetermined hypotheses, for example.

Figure 3:
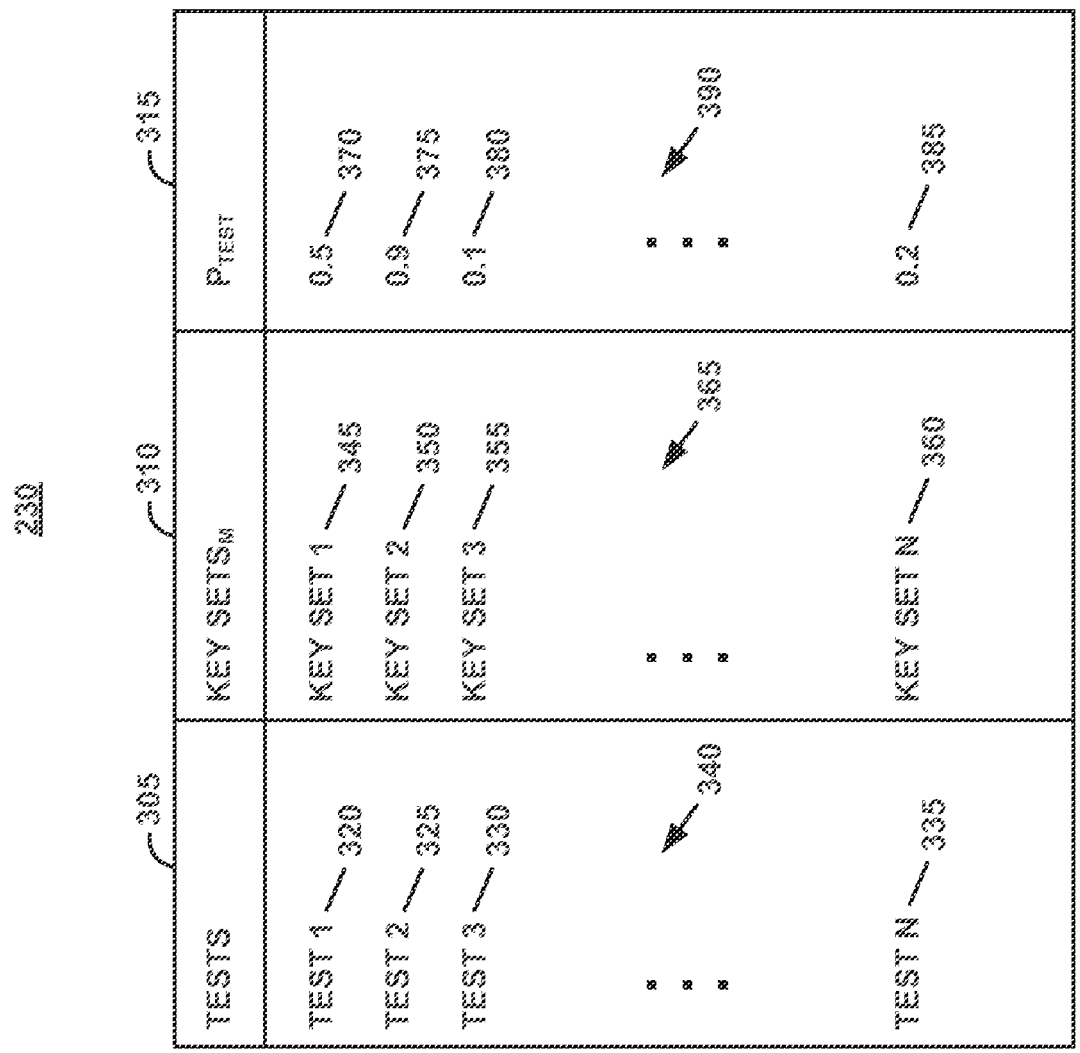
FIG. 3 is an exemplary tabular representation of a circumvention device model of the traitor tracing system of FIGS. 1 and 2.

FIG. 3 illustrates an exemplary tabular representation of the circumvention device model 230. While shown in tabular form for illustration purposes only, the circumvention device model 230 may also take the form of a function, a graphical model, a Bayesian network representation, etc. The circumvention device model 230 comprises one or more tests in a tests column represented as tests 305. The circumvention device model 230 further comprises key sets corresponding to the one or more tests in tests 305, represented as a key sets column, indicated as key sets$_M$ 310, where the M subscript indicates the circumvention device model 230. Each of the key sets in the key sets$_M$ 310 has an associated probability that the circumvention device 20 plays the associated test in tests 305, given that the circumvention device 20 comprises the associated key set in the key sets$_M$ 310. This associated probability is indicated in a column labeled P$_{TEST}$ 315.

Tests 305 comprises test 1, 320, test 2, 325, test 3, 330, through test N, 335, collectively referenced as tests 340. The key sets$_M$ 310 comprises a key set 1, 345, a key set 2, 350, a key set 3, 355, through a key set N 360, collectively referenced as key sets 365. P$_{TEST}$ 315 comprises a probability 370, a probability 375, a probability 380, through a probability 385, collectively referenced as probabilities 390. For example, the probability that test 1, 320, plays on the circumvention device 20 given that the circumvention device 20 comprises the key set 1, 345, is 0.5 (probability 370).

Figure 4:
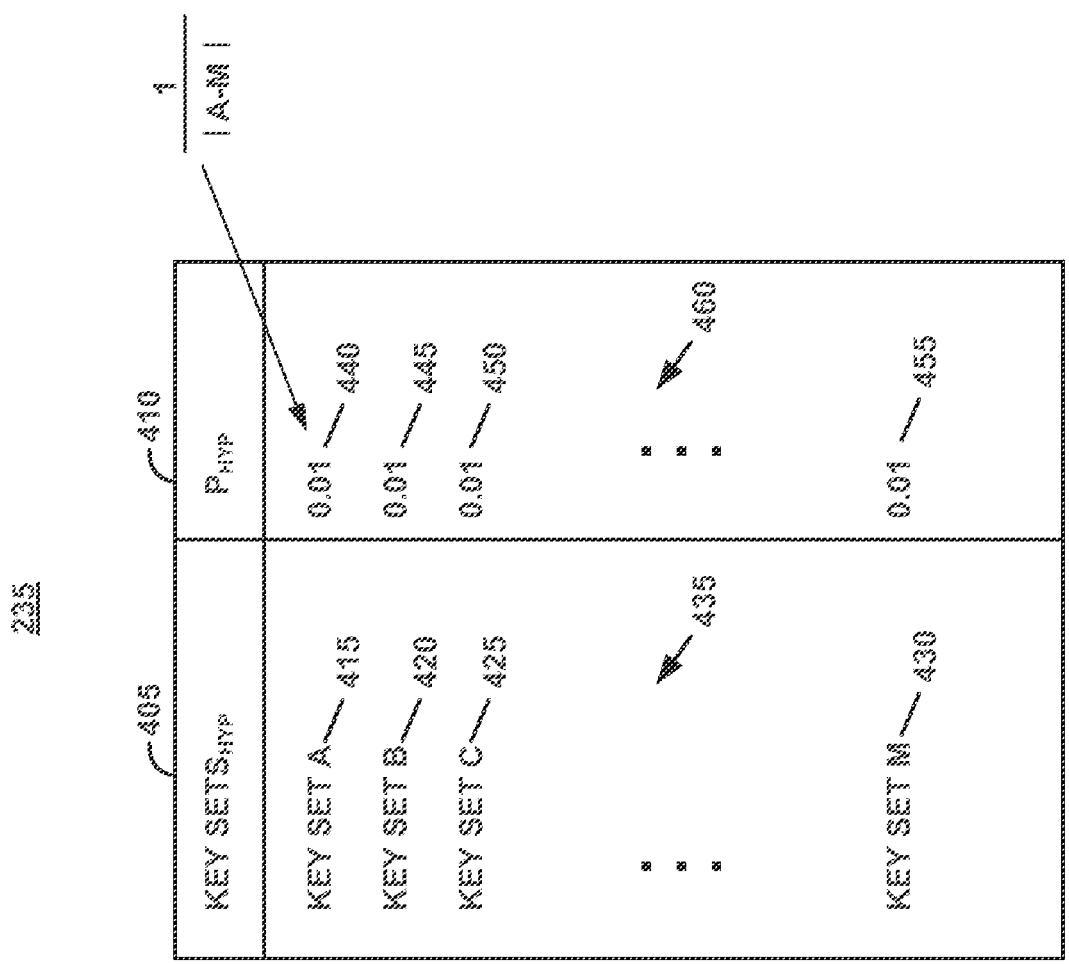
FIG. 4 is an exemplary tabular representation of a hypothesized model module of the traitor tracing system of FIGS. 1 and 2.

FIG. 4 illustrates an exemplary tabular representation of the hypothesized model 235. While shown in tabular form for illustration purposes only, the hypothesized model 235 may also take the form of a function, a graphical model, a Bayesian network representation, etc. The hypothesized model 235 comprises a set of keys represented as a column key sets$_{HYP}$ 405.

Each of the key sets in key sets$_{HYP}$ 405 has a corresponding probability represented as a column P$_{HYP}$ 410. The probability in P$_{HYP}$ 410 quantifies a belief or hypothesis that the circumvention device 20 comprises an associated set of keys indicated in key sets$_{HYP}$ 405.

The key sets$_{HYP}$ 405 comprise a key set A 415, a key set B 420, a key set C 425, through a key set M 430, collectively referenced as hypothesized key sets 435. Key set M, 430, represents a last key set in the set of the hypothesized key sets 435 of unknown count. A probability is assigned to each of the hypothesized key sets 435 that represents a belief that the circumvention box 20 comprises an associated key set entry in the key sets$_{HYP}$ 405.

The probabilities of P$_{HYP}$ 410 comprise a probability 440, a probability 445, a probability 450, through a probability 455, collectively referenced as probabilities 460. The probabilities of P$_{HYP}$ 410 are initialized to equal belief for each of the hypothesized key sets 435. Consequently, each of the hypothesized probabilities of P$_{HYP}$ 410 is initialized to 0.5. After each of the responses 45, the hypothesis update module 220 updates the hypothesized probabilities 460 to reflect knowledge gained by the preceding test 40.

By carefully choosing the hypothesized key sets 435, system 10 does not have to test all of the key sets that the circumvention device 20 may comprise. Instead, system 10 iteratively focuses in on the correct set of keys via the iterative test 35.

Figure 5:
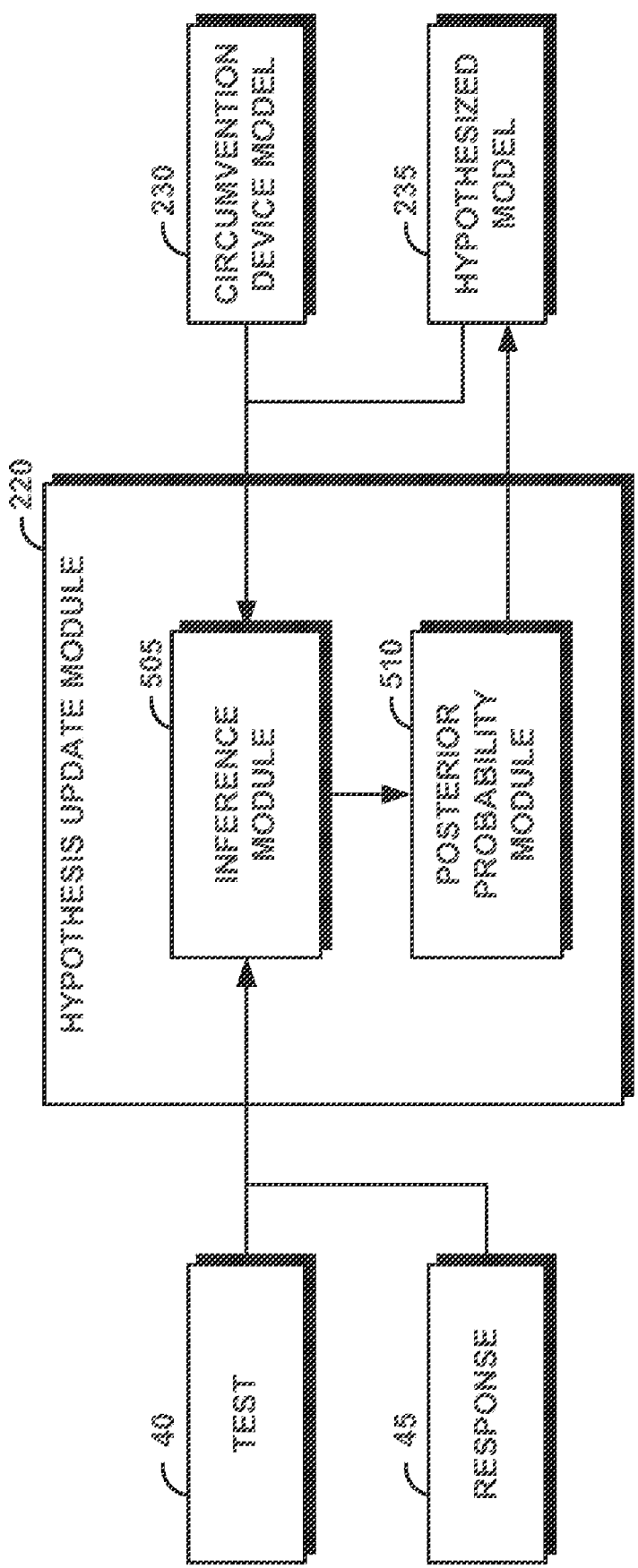
FIG. 5 is a block diagram of a hypothesis update module of the traitor tracing system of FIGS. 1 and 2.

FIG. 5 illustrates a high-level hierarchy of the hypothesis update module 220. The hypothesis update module 220 comprises an inference module 505 and a posterior probability module 510. The inference module 505 comprises any known inference logic such as, for example, variable elimination, belief propagation, junction tree, etc.

The inference module 505 receives an input comprising one of the tests 40, the associated response 45 provided by the circumvention device 20 as a result of the test 40, a current version of the circumvention device model 230, and a current version of the hypothesized model 235. The response 40 is evidence used by the inference module 505 to increase or decrease the associated probability in P$_{HYP}$ 410.

The inference module 505 provides analysis of the input to the posterior probability module 510. The posterior probability 510 uses the analysis to adjust the hypothesized probabilities 460 of the hypothesized model 235, updating the hypothesized model 235 to reflect knowledge gained from the response 45.

The test selection module 225 receives as input the circumvention device model 230 and the hypothesized model 235. The test selection module 225 comprises a function that describes the significance of a test 40. Given one of the tests 40, the circumvention device model 230, and the hypothesized model 235, the test selection module 225 determines which evidence is pursued in determining the hypothesized compromised device keys 25A in the circumvention device 20. From this determination, the test selection module 225 formulates a next test to apply to the circumvention device 20.

Figure 6:
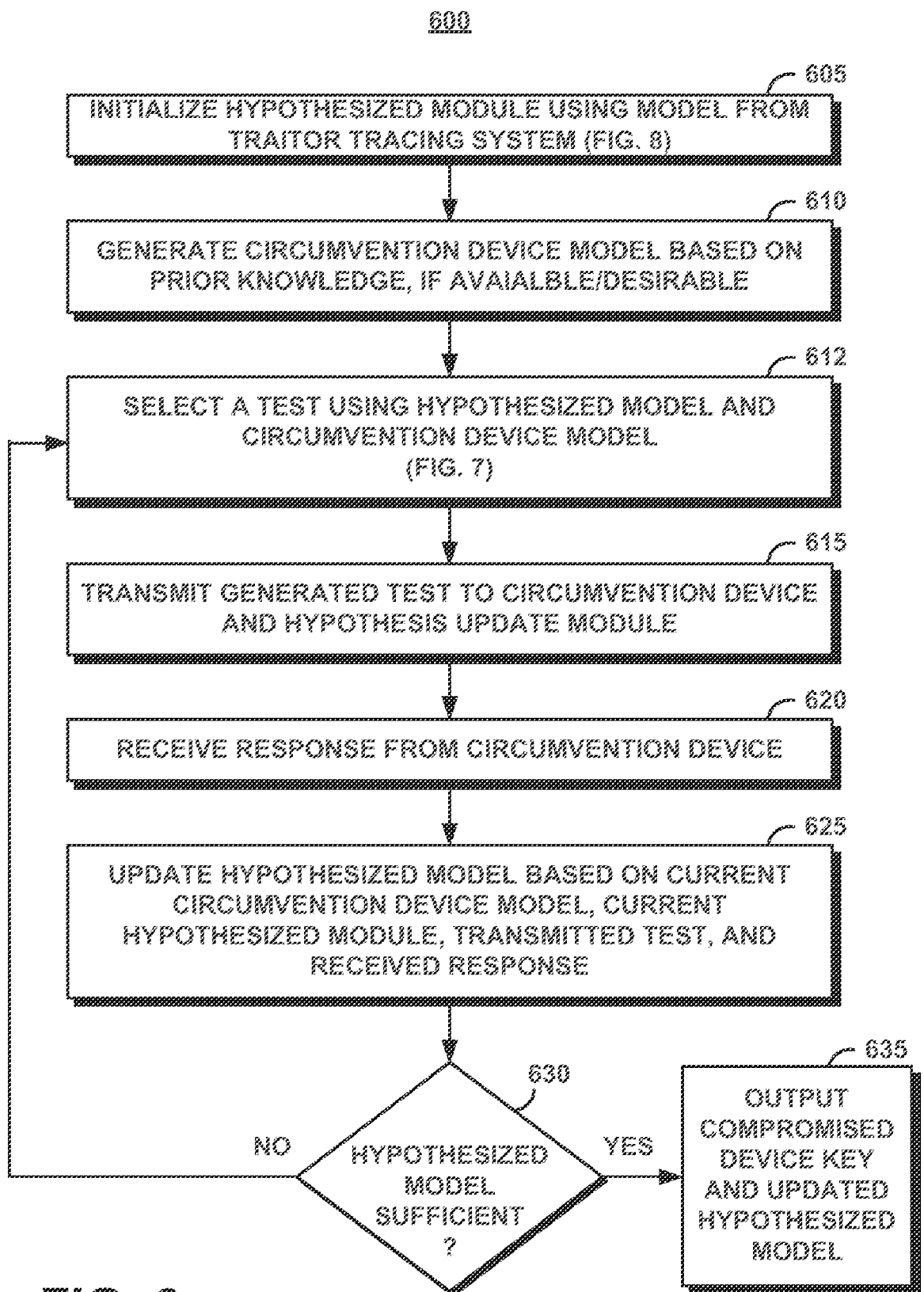
FIG. 6 is a process flow chart illustrating a method of operation of the traitor tracing system of FIGS. 1 and 2 in identifying a compromised device key.

FIG. 6 illustrates a method 600 of system 10 in determining the compromised device keys 25B in the circumvention device 20. The hypothesized model module 210 initializes the hypothesized model 235 using the one passed to it (step 605). The initialized state of the hypothesized model 235 comprises an equal probability the circumvention device 20 comprises each of the hypothesized key sets 435 in the hypothesized model 235. System 10 does not favor any particular state of the circumvention device 20 over any other state. The probability that the circumvention device 20 contains every subset of device keys represented by key sets 435 is initially equal. The circumvention device model module 210 generates the circumvention device model 230 based on prior knowledge provided by the prior knowledge module 205 (step 610).

Figure 7:
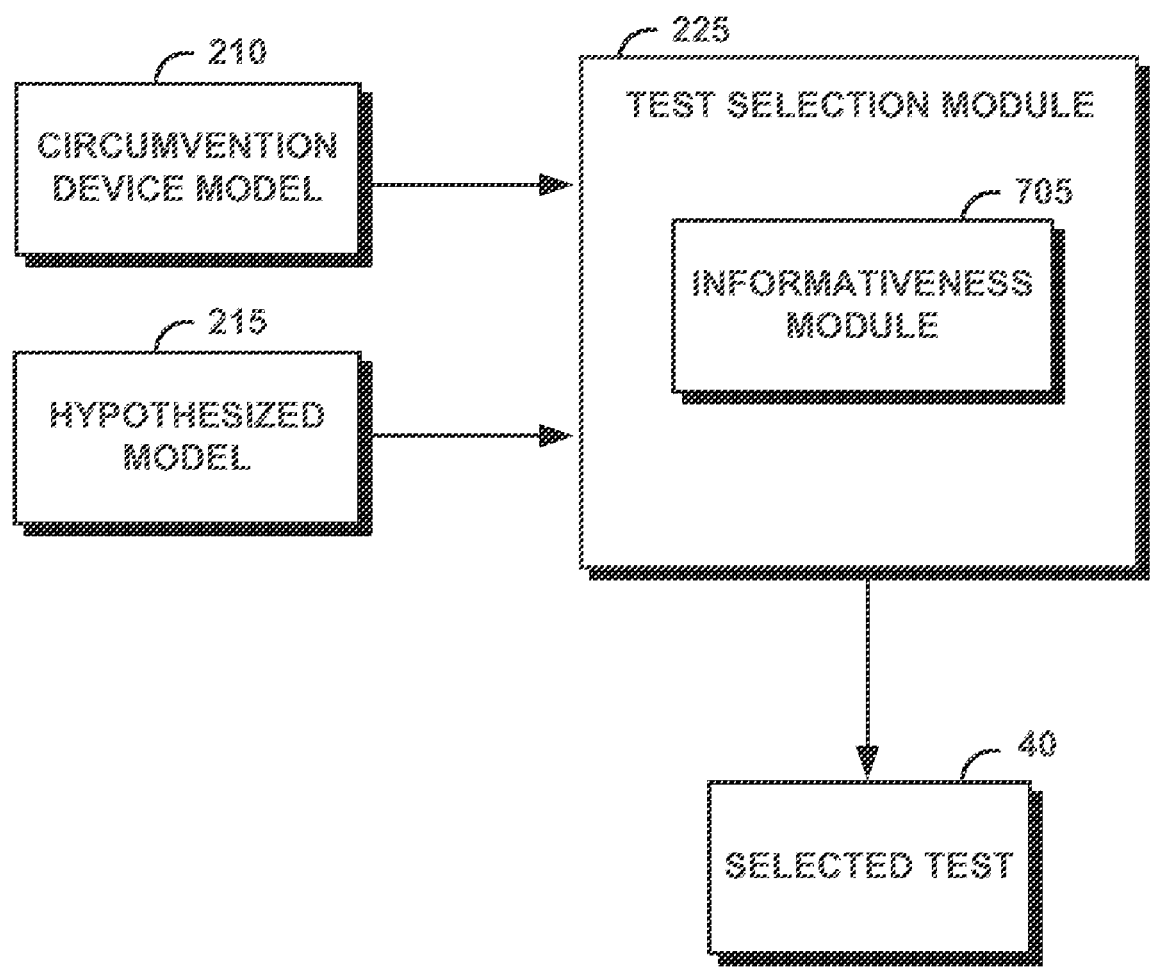
FIG. 7 is a block diagram illustrating a test selection module for generating a test of a circumvention device using the hypothesized model and the circumvention device model of the traitor tracing system of FIGS. 1 and 2.

With reference to FIG. 7, the test selection module 225 selects a test 40 using the circumvention device model 230 and the hypothesized model 235. The test selection module 225 searches a set of possible tests and selects one based on predetermined selection criteria. In one embodiment, the test 40 is a forensic media key block.

The test selection module 225 may utilize any suitable or available method to select the next test 40. In one embodiment, the test selection module 225 includes an informativeness module 705 for selecting the test 40 based on the informativeness or information gained from the test 40.

The test selection module 225 transmits the generated test 40 to the circumvention device 20 and the hypothesis update module 215 (step 615). The hypothesis update module 220 receives response 45 from the circumvention device 20 (step 620). The hypothesis update module 220 updates the hypothesized model 235 based on a current circumvention device model 230, a current hypothesized model 235, the transmitted test 40, and the received response 45 (step 625).

The hypothesis update module 220 may utilize any method to incorporate the response 45 into the hypothesized model 235. One embodiment uses graphic models to incorporate responses 45 into the hypothesized model 235. Another embodiment uses Bayesian networks to incorporate responses 45 into the hypothesized model 235.

The inference module 505 can employ any standard inference algorithm that is applicable for graphical models. Such inference algorithms comprise variable elimination and belief propagation. The inference module 505 may further utilize approximation algorithms to achieve inference in a graphical model. The inference module 505 may use any approximation algorithm. Examples of approximation algorithms comprise sample based approximation, partition-based approximation (e.g., mini-bucket), and loopy belief propagation.

With reference to FIG. 2, the significance module 212 determines whether the hypothesized model is sufficient; i.e., whether system 10 can infer with confidence from previous results that a device key is one of the hypothesized compromised device keys 25A (decision step 630). If not, processing returns to step 612 and repeats steps 612 to 630 until the hypothesized model is sufficient. System 10 then outputs the hypothesized identified compromised device key 25A (step 635).

The significance module 212 in system 10 uses a marginal probability to determine whether from the hypothesized model 235 we can conclude that the hypothesized compromised device keys 25A are in the circumvention device. The output of system 10 includes the hypothesized compromised device keys 25A.

Figure 8:
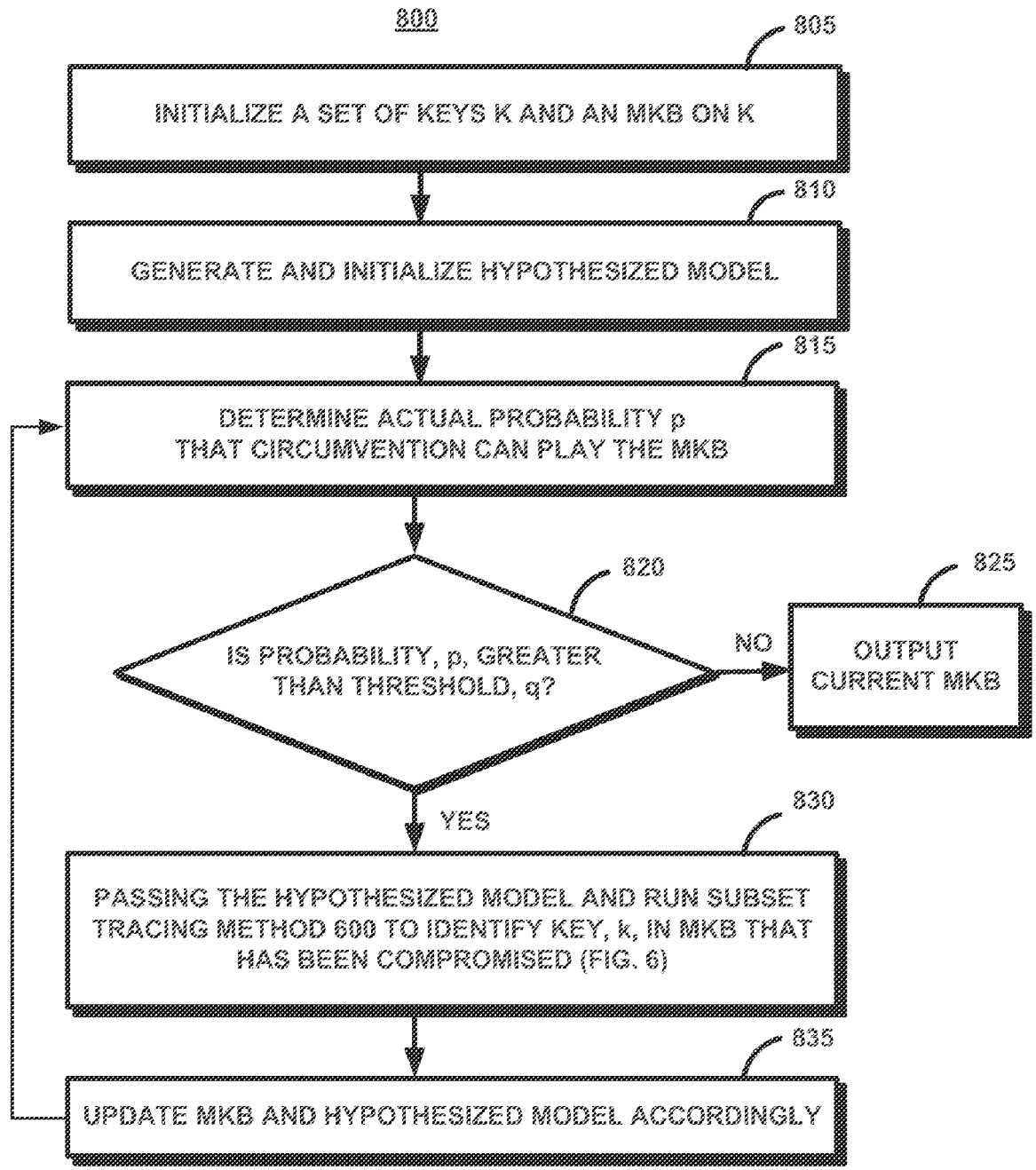
FIG. 8 is a process flow chart illustrating a method of operation of the traitor tracing system of FIGS. 1 and 2 in identifying a set of compromised device keys used by a circumvention device comprising more than one compromised device key.

FIG. 8 illustrates a method 800 of system 9 in identifying a set of compromised device keys 25B used by a circumvention device that contains more than a single compromised device key 25B.

At step 805, method 800 initializes an MKB that covers the legitimate devices. At step 810, method 800 generates and initialize the hypothesized model. The initialized state of the hypothesized model comprises an equal probability the circumvention device comprises each of the hypothesized key sets in the hypothesized model. Method 800 does not favor any particular state of the circumvention device over any other state. At step 815, method 800 determines the probability, p, that the circumvention device 20 can play the MKB. At step 820, method 800 determines whether the circumvention device 20 is capable of playing the MKB often enough that is poses a threat, i.e., whether the probability, p, is greater than a potential threshold, q (p>q).

If method 800 determines that the probability, p, is less than or equal to the potential threshold, q, method 800 returns the MKB at step 825. If, however, method 800 determines that the probability, p, is greater than the potential threshold, q (p>q), method 800 proceeds to step 830, where it assumes that the circumvention device 20 still poses a threat. Method 800 then passes on the hypothesized model and identifies a key, k, in the MKB that has been compromised, as described in more detail in connection with FIG. 6 (i.e., the key, k, contained in the circumvention device 20).

Once the key is identified at step 830, method 800 modifies the MKB so that the key, k, is no longer contained in the MKB. This might require that the key, k, be replace with at least one key in the MKB. The hypothesized model is also updated on the new keys added to MKB. Method 800 reiteratively repeats steps 815 through 835 until system 9 is satisfied that the compromised device keys 25B have been identified as approximated by the hypothesized device keys 25A.

An example of application of system 10 is as follows. Given that U is the set of all devices, KS is the key corresponding to a subset S of U, and T(F, G) is test 40 comprising keys in F enabled and keys in G disabled. System 10 writes C[T]=1 if the circumvention device 20 is able to play test 40; C[T]=0 circumvention device 20 does not play test 40.

An exemplary logic procedure, ProbabilityTestPlays(T, C), of the hypothesized model module 215 determines the actual probability, p, that the circumvention device 20 plays test 40. An exemplary logic procedure, SubsetTracing(FR, C, R, H), of the subset tracing module 10 determines a compromised device key 25A in FR.

The logic procedures ProbabilityTestPlays(T, C, R) and SubsetTracing(frontier, C, R, H) further return an updated version of a history of the iterative tests 35. System 9 leverages the logic procedure SubsetTracing(frontier, C, R, H) to diagnose compromised keys.

An exemplary logic procedure for method 800 is as follows:

Input: 0 < q < 1, the circumvention device 20 (C), and any parameters specific to the logic procedure
Initialize: frontier={KU}, R = { }, and any initialization specific to the logic procedure
Repeat
  [R, p] ← ProbabilityTestPlays(T(frontier,{ }), C,R).
  If( p < q)
  return frontier
  [R, S] ←SubsetTracing(frontier, C, R,H)
  frontier ← frontier/{KS}
  If( | S | > 1)
  Split S into sets Sa and Sb such that there exists keys KSa and KSb
  frontier ← frontier +{KSa,KSb}

In one embodiment, system 10 is implemented using the concept of information gain from information theory. The hypothesized model module 215 comprises a function, B(K|R), which indicates the strength of the hypothesis that suspected compromised device keys (further referenced herein as K) are used by the circumvention device 20, conditioned on the probe history R. To calculate the information gain, the hypothesized model module 215 further specifies the probability (further referenced herein as P) that the circumvention device 20 plays test 40, conditioned on the history of the iterative test 35.

Figure 9:
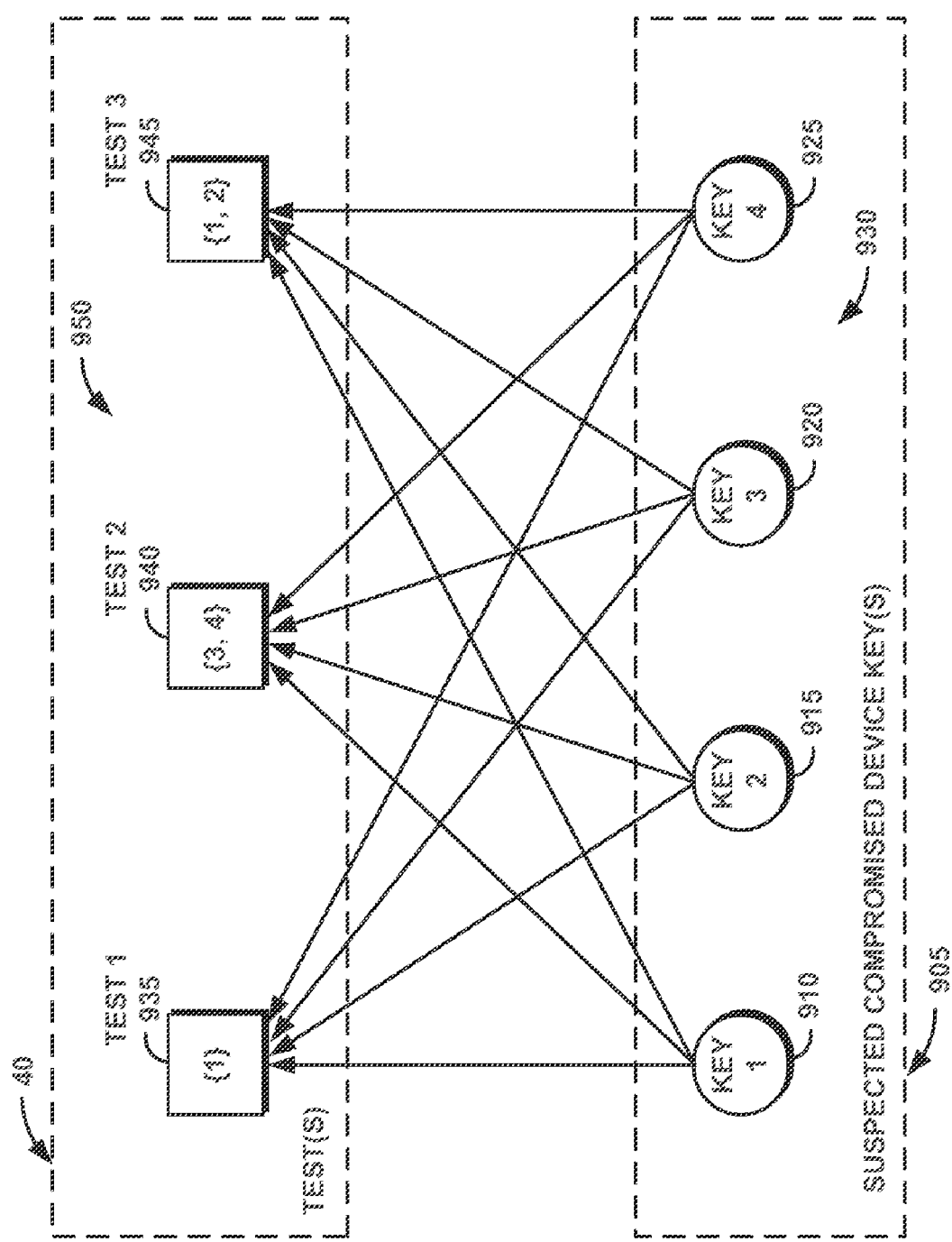
FIG. 9 is a diagram of a set of tests and a set of suspected compromised device keys illustrating operation of the traitor tracing system of FIGS. 1 and 2.

Specifying the functions B and P can be achieved using graphical models such as, for example, Bayesian networks or belief networks. In FIG. 9, frontier FR and tests 40 are modeled as a bipartite graph. Each of the keys in frontier 905 are represented by a key node such as, for example, a key 1, 910, a key 2, 915, a key 3, 920, and a key 4, 925, collectively referenced as key nodes 930. Each of the key nodes 930 is associated with a prior probability that the circumvention device 20 uses the suspected compromised device key 905.

Each of the tests 40 is represented by a test node such as, for example, a test 1, 935, a test 2, 940, and a test 3, 945, collectively referenced as test nodes 950. Each of the test nodes 950 specifies a conditional probability distribution (CPD) specified by the circumvention device model 210. The probability is conditioned on which suspected compromised device keys 905 are owned by the circumvention device 20. Any of the standard inference algorithms for graphical models can be used to calculate B and P. Since B and P are both proper conditional probability distributions, the information gain (IG) of a test, with respect to a frontier represented by the circumvention device 20, is defined, for example in T. Cover, and J. Thomas, "Elements of Information Theory," Wiley-Interscience 1938.

Method 600 can be represented as the following exemplary pseudocode:

```
procedure SubsetTracing(FR, C, R, H):
    initialize circumvention device model
    repeat
        find test T such that IG(T) is maximized
        get response r of circumvention device to test T
        update hypothesized model H based on response
        for each f in frontier FR
            if(B({f}|H) > 1-epsilon)
                return [f, H]
```

It is to be understood that the specific embodiments of the invention that have been described are merely illustrative of certain applications of the principle of the present invention. Numerous modifications may be made to the system, method, and service for tracing traitors from content protection circumvention devices described herein without departing from the spirit and scope of the present invention.

What is claimed is:

1. A processor-implemented method of tracing a traitor from a circumvention device, the circumvention device comprising a set of compromised device keys obtained from the traitor, the method comprising:

generating a hypothesized model using a computer processor on a hypothesized set of device keys that models a hypothesis that the circumvention device comprises the hypothesized set of device keys, wherein the hypothesized model is represented by any of a tabular form, a function, a graphical model, and a Bayesian network;

passing the hypothesized model to a subset tracing method to identify a first compromised device key, the subset tracing method comprising:

generating a circumvention device model that models a behavior of the circumvention device, wherein the circumvention device model comprises a set of tests from which tests are selected, a set of key sets comprising one key set for each of the set of tests, and a probability for each of the key sets indicating a probability that the circumvention device will play the one of the set of tests associated with the key set, with the probability based on a history of iterative tests; and the circumvention device model is represented by any of a tabular form, a function, a graphical model, and a Bayesian network;

selecting a test, utilizing gained informativeness information and based on the hypothesized model and the circumvention device model, to apply to the circumvention device, wherein the selected test comprises a forensic media key block that obtains informative data about the first compromised device key by observing the response;

encrypting the test;

storing the history of the iterative tests;

receiving a response from the circumvention device, the response indicating a success of the selected test in playing a protected content on the circumvention device;

updating the hypothesized model using the received response, incorporating the response into the hypothesized model using any of a graphic model or a Bayesian network, and using the selected test, a current version of the hypothesized model, and a current version of the circumvention device model for selecting at least one test that identifies the compromised device keys obtained from the traitor and incorporating predetermined hypotheses regarding hypothesized compromised keys; and testing the hypothesized model to determine the strength of the belief that the first compromised device key is contained in the circumvention device;

removing the first compromised device key, adding new keys to the hypothesized set of keys and updating the hypothesized model, wherein updating the hypothesized model comprises:

generating the probabilities of the newly added keys being in the circumvention device; and applying an inference logic using any of a variable elimination, a belief propagation, and a junction tree, wherein the inference logic utilizes an approximation algorithm comprising any of a sample based approximation, a partition-based approximation, and a loopy belief propagation;

iteratively detecting additional compromised device keys from the set of compromised device keys, until substantially all the compromised device keys in the set of compromised device keys are identified so as to disable the circumvention device; and creating a media key block (MKB) on the hypothesized set of device keys that disables the circumvention device.

2. The method of claim 1, wherein the method determines a probability regarding whether the circumvention device is capable of playing the media key block often enough to pose a threat.

3. The method of claim 1, wherein the method identifies one of the set of compromised device keys in the media key block and removes the identified one of the set of compromised device keys from the media key block.

* * * * *